United States Patent [19]

Meernik

[11] Patent Number: 5,251,915
[45] Date of Patent: Oct. 12, 1993

[54] PISTON AND RING ASSEMBLY
[75] Inventor: Paul R. Meernik, Redford, Mich.
[73] Assignee: General Motors Corporation, Detroit, Mich.
[21] Appl. No.: 665,526
[22] Filed: Feb. 28, 1991

Related U.S. Application Data

[63] Continuation-in-part of Ser. No. 478,867, Feb. 12, 1990, abandoned.

[51] Int. Cl.⁵ .......................... F16J 9/16; F16J 15/32
[52] U.S. Cl. ..................................... 277/138; 277/141; 277/143; 277/216
[58] Field of Search ............... 277/138, 139, 141, 143, 277/146, 148, 149, 117, 119, 168, 154, 156, 216, 222, 142, 144

[56] References Cited

U.S. PATENT DOCUMENTS

| Re. 32,395 | 4/1987 | Geffroy et al. | |
|---|---|---|---|
| 355,730 | 1/1887 | St. John . | |
| 1,173,319 | 2/1916 | Small | 277/143 |
| 1,413,922 | 4/1922 | Marshall | 277/144 |
| 1,413,923 | 4/1922 | Marshall | 277/143 |
| 1,470,096 | 10/1923 | Myers | 277/144 |
| 1,556,312 | 10/1925 | Davis . | |
| 1,640,155 | 8/1927 | Low . | |
| 1,878,641 | 9/1932 | Nichols | 277/144 |
| 2,082,056 | 6/1937 | Hodge | 277/144 |
| 2,162,555 | 6/1939 | Kurth | 277/143 |
| 2,251,195 | 7/1941 | Meunier . | |
| 2,589,154 | 3/1952 | Smith . | |
| 2,638,390 | 5/1953 | Neeme . | |
| 2,723,170 | 11/1955 | Bauer . | |
| 2,757,057 | 7/1956 | Sanon . | |
| 2,767,038 | 10/1956 | Brown . | |
| 2,785,030 | 3/1957 | Olson | 277/140 |
| 2,855,254 | 10/1958 | Beck et al. . | |
| 2,900,213 | 8/1959 | Bruce . | |
| 2,938,758 | 5/1960 | Phillips . | |
| 2,940,803 | 6/1960 | Phillips . | |
| 3,228,704 | 1/1966 | Hamm | 277/142 |
| 3,276,782 | 10/1966 | Fuhrmann . | |
| 3,400,941 | 9/1968 | Hutto | 277/139 |
| 3,717,293 | 2/1973 | Traub et al. | 277/143 |
| 3,811,690 | 5/1974 | Moriarty . | |
| 3,893,675 | 7/1975 | Geffroy . | |
| 3,917,133 | 11/1975 | Sakakibara . | |
| 3,942,808 | 3/1976 | Gross . | |
| 4,011,030 | 3/1977 | Staebler et al. | 277/138 |
| 4,099,730 | 7/1978 | Nisper . | |
| 4,111,438 | 9/1978 | Longfoot . | |
| 4,185,842 | 1/1980 | Magara . | |
| 4,240,644 | 12/1980 | Busto . | |
| 4,384,729 | 5/1983 | Birenbaum . | |
| 4,615,531 | 10/1986 | Green . | |
| 4,695,064 | 9/1987 | Brauers et al. . | |

FOREIGN PATENT DOCUMENTS 6802 of 1894 United Kingdom .
544848 4/1942 United Kingdom .

Primary Examiner—William A. Cuchlinski, Jr.
Assistant Examiner—Daniel G. DePumpo
Attorney, Agent, or Firm—Robert J. Outland

[57] ABSTRACT

The oil control ring for a piston has a single low tension rail and a contiguous blocker ring, under light tension, to prevent oil flow through the rail end gap. A separate spring applies tension to the rail. A serpentine spring in conic form presses outwardly on the rail and presses inwardly on a restraining ring. A separator ring behind the blocker ring allows oil flow to a drainage vent to help keep the region behind the blocker ring dry. A dike behind the blocker ring in the form of a closed ring or a recess formed in the groove collects oil thrown upwardly on the upper half of the piston cycle to prevent oil leakage through the upper axial clearance or the blocker ring end gap.

20 Claims, 4 Drawing Sheets

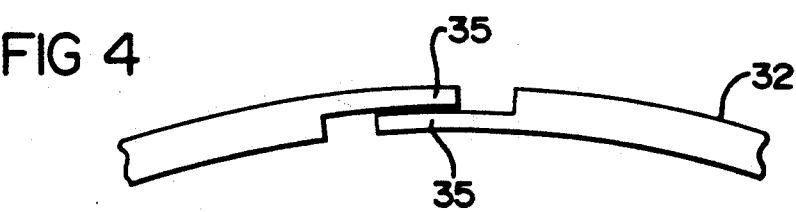
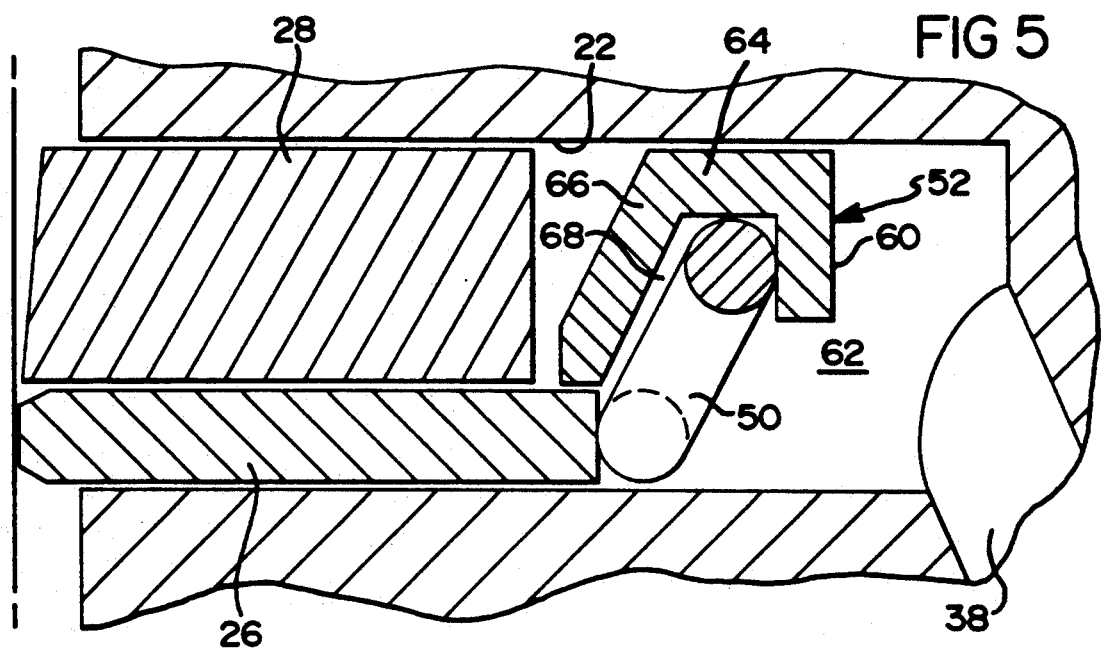
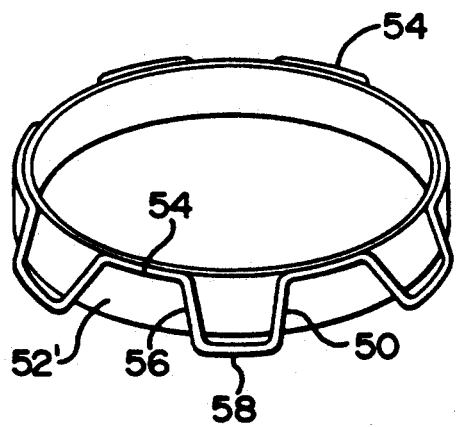
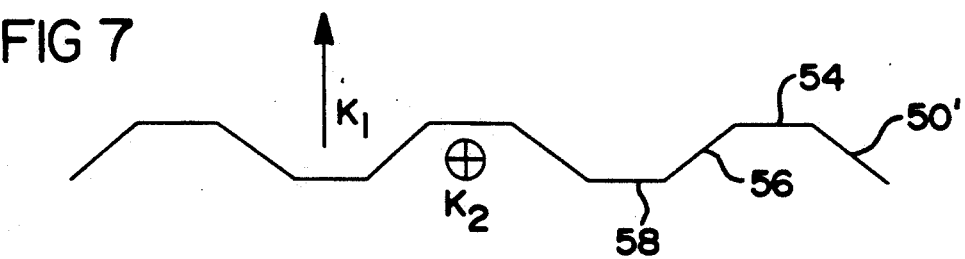

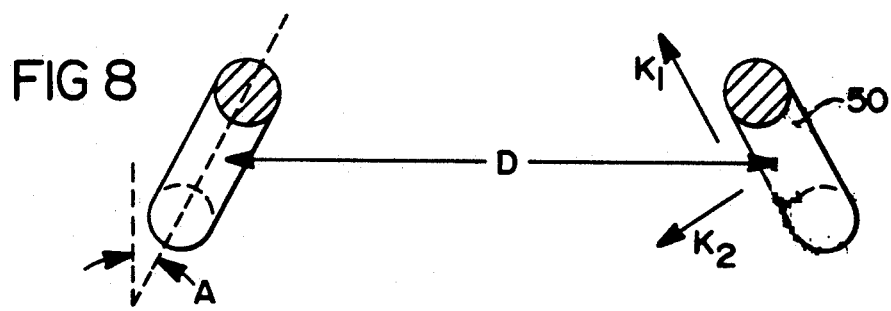
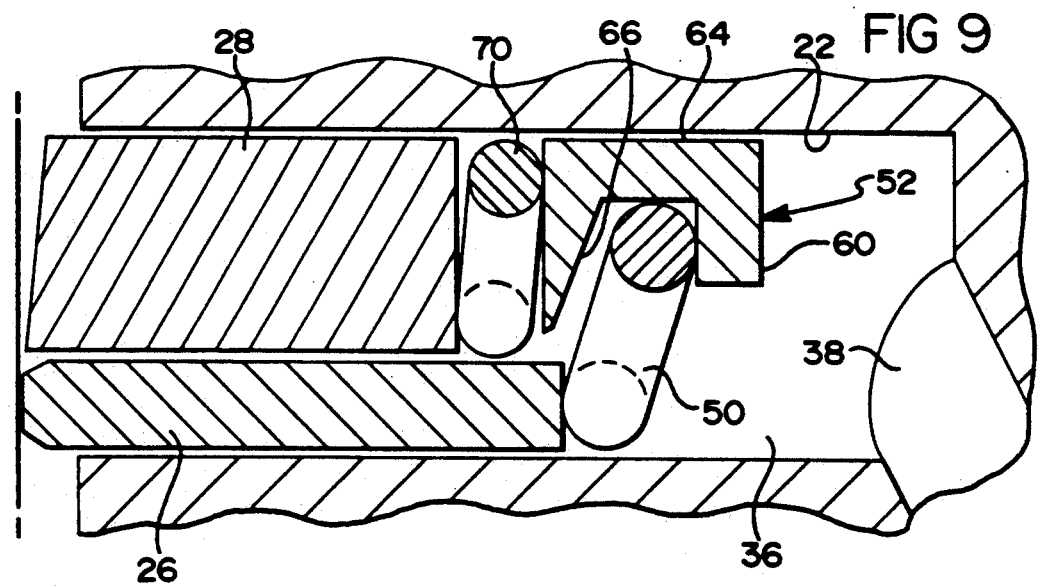
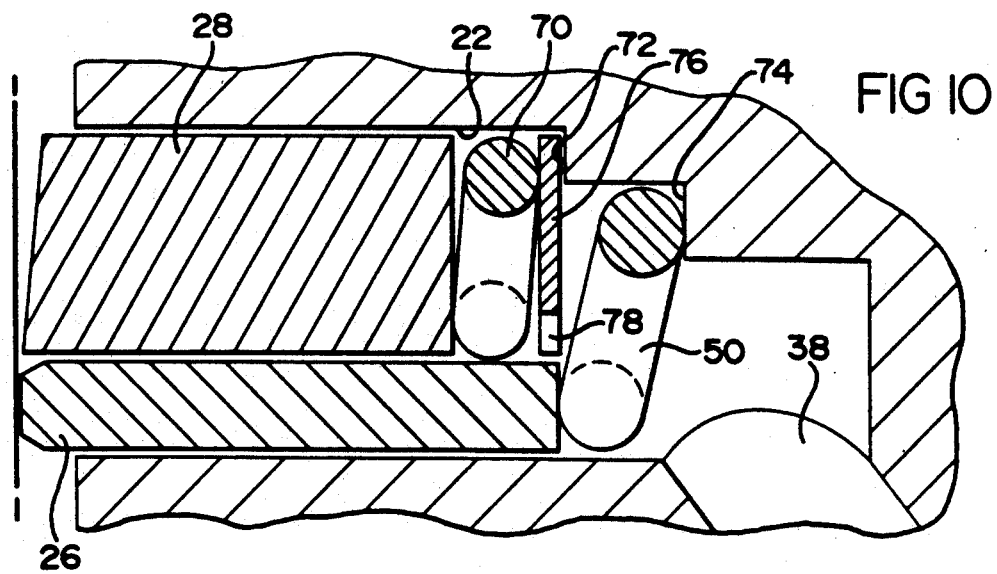

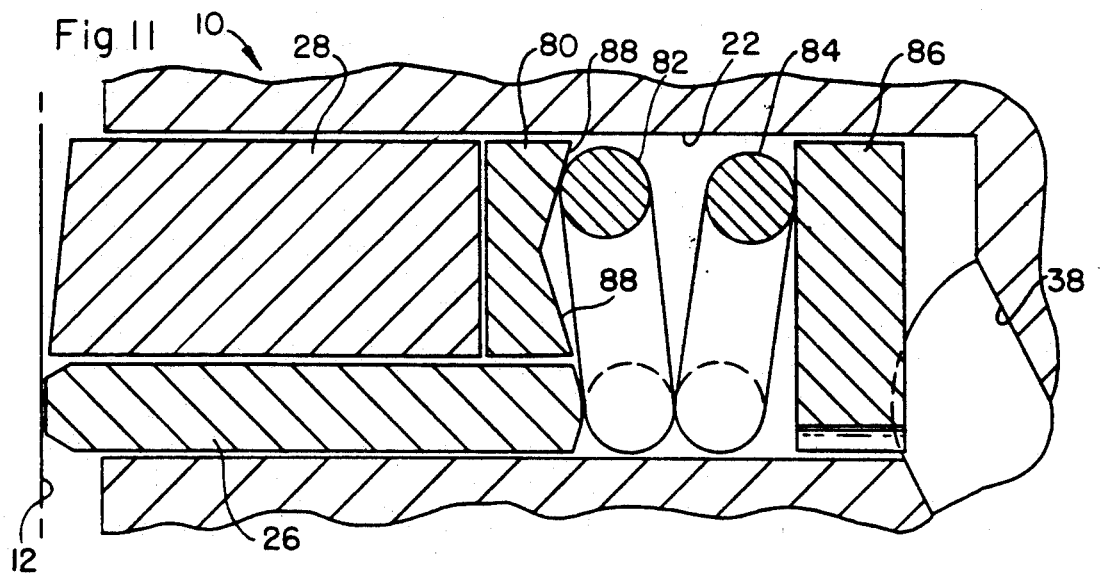
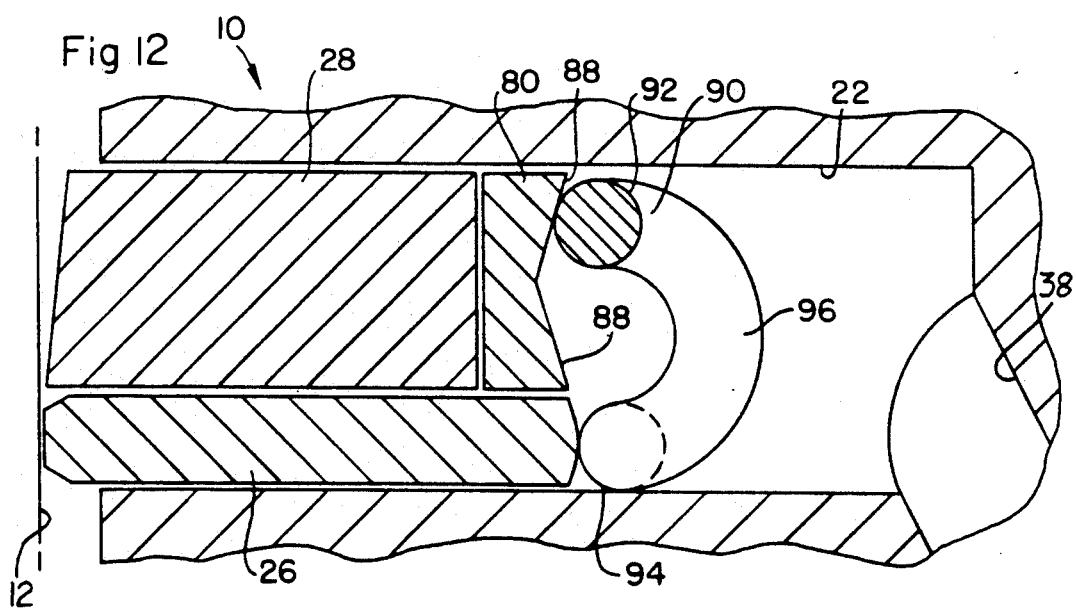
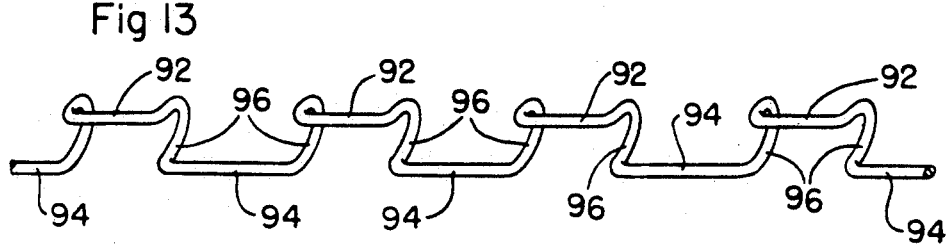

PISTON AND RING ASSEMBLY

CROSS REFERENCE

This is a continuation-in-part of abandoned U.S. Pat. application Ser. No. 07/478,867 filed Feb. 12, 1990.

TECHNICAL FIELD

This invention relates to a piston and ring assembly and particularly to such an assembly for control of fluid leakage.

BACKGROUND

It is commonplace to control oil leakage past a piston in the cylinder of an engine by oil control rings in a groove of the piston. Usually two rings in the groove are biased against the cylinder wall by an expansion ring in the groove. The rings have the function of scraping the oil from the cylinder walls as the piston moves down. To assure the removal of sufficient oil, a high tension is maintained on the rings; this is at the expense of high friction of the rings against the cylinder walls and consequent lowering of engine efficiency. The rings each have ends defining a gap which permits oil leakage and thus limits attempts to lower the oil consumption rate. The rings typically are tensioned by a common expander and are spaced by the expander so that a leakage path exists even though the gaps are not aligned. Further, attempts to improve oil consumption can be limited by the flow of oil under the rings into the groove and out of the groove over the upper ring surface.

SUMMARY OF THE INVENTION

It is therefore an object of the invention to provide a piston and ring assembly which improves oil consumption while decreasing friction.

Another object is to provide an improved spring arrangement for biasing oil rings or compression rings.

A further object is to provide an oil trap within a ring assembly to inhibit oil loss from a piston ring groove.

The invention is carried out by an assembly having a piston for reciprocating movement in a cylinder between a lower crankcase and an upper compression head, the piston having an annular groove for seal means, a single rail in the groove for slidably engaging the cylinder wall to prevent fluid passage across the rail, the rail having spaced ends which potentially allow fluid leakage past the rail, spring means between the rail and the inner wall of the groove for biasing the rail against the cylinder wall with a desired tension, and a blocker ring in the groove contiguous with the rail for blocking fluid leakage past the ends of the rail, the blocker ring having sufficient tension to maintain light contact with the cylinder wall.

The invention is further carried out by a piston seal assembly including a sinuous spring having a frustoconical form when unloaded and an adjacent restraining member, the sinuous spring having alternate contact portions bearing radially against the piston ring and the restraining member respectively and being loaded when assembled to apply a tension to the ring.

The invention is also carried out by a piston ring assembly wherein the space between the ring and the inner wall of the groove includes structure for trapping oil during the upper half of the piston cycle, and the piston having oil vent means coupled to the groove for releasing the trapped oil during the lower half of the piston cycle.

The invention is additionally carried out by a seal ring urged against the inner face of the blocker ring and the upper side of the associated ring groove to define part of the oil trapping structure and prevent oil loss through the upper ring to groove clearance. Alternative spring arrangements are also provided.

BRIEF DRAWING DESCRIPTION

The above and other advantages of the invention will become more apparent from the following description taken in conjunction with the accompanying drawings wherein like references refer to like parts and wherein:

FIG. 4 is a detail of overlapping ends of a separator ring according to the invention;

FIG. 5 is an enlarged detail cross section of an oil control seal assembly according to a third embodiment of the invention;

FIG. 6 is an isometric view of the spring assembly of the embodiment of FIG. 5;

FIGS. 7 and 8 are diagrammatic views of the spring of FIG. 5;

FIG. 9 is an enlarged detail cross section of an oil control seal assembly according to a fourth embodiment of the invention;

FIG. 10 is an enlarged detail cross section of an oil control seal assembly according to a fifth embodiment of the invention;

FIG. 11 is an enlarged detail cross section of an oil control seal assembly according to a sixth embodiment of the invention;

FIG. 12 is an enlarged detail cross section of an oil control seal assembly according to a seventh embodiment of the invention; and FIG. 13 is an isometric view showing a linearized form of a curved compression spring similar to that of FIG. 12.

DETAILED DESCRIPTION

The invention is described in terms of a piston having two sets of rings; however, it should be apparent that it is not limited to that configuration. Further the invention is described as applied to oil control rings but some features of the invention apply also to compression rings. In particular, the conic spring arrangement and oil trapping features are readily applied to compression rings.

Figure 1:
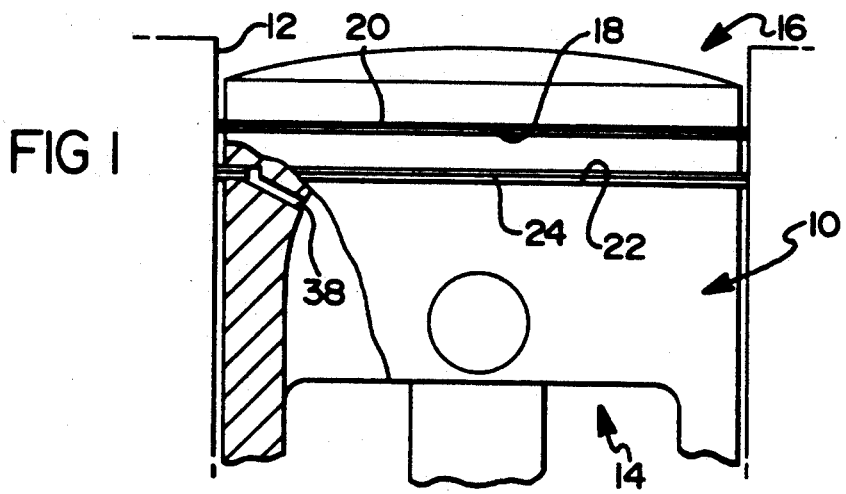
FIG. 1 is a partly sectioned elevation of a prior art piston adapted to use rings according to the invention.

In FIG. 1, a piston 10 in a cylinder 12 reciprocates between a crankcase 14 and compression head 16 of an internal combustion engine. The piston is slightly spaced from the cylinder walls. A groove 18 near the top of the piston 10 contains a compression ring 20 and a groove 22 farther from the top contains oil control rings 24.

Figure 2:
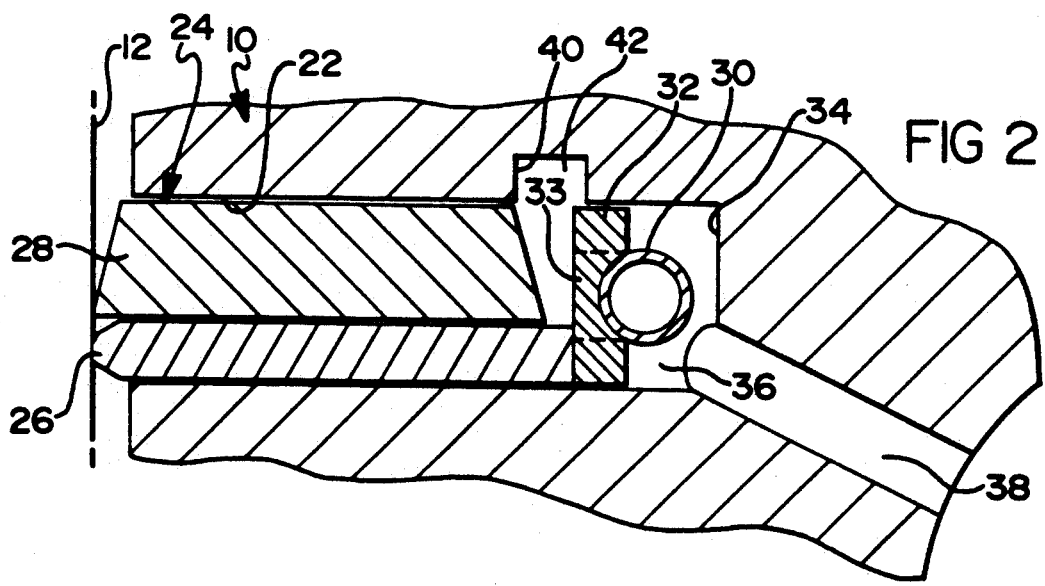
FIG. 2 is an enlarged detail cross section of an oil control seal assembly according to a first embodiment of the invention.

The enlarged sectional view of FIG. 2 illustrates one embodiment of the oil control rings according to the invention. Two rings are in the groove 22: a steel rail 26 and a blocker ring 28. The two rings substantially fill the groove in the vertical (axial) direction but clearance for thermal expansion and to assure free motion is allowed. The rail 26 and the blocker ring 28 are split to permit insertion into the groove 22 and to allow expansion against the cylinder wall 12 and thus each has an end gap. The blocker ring and rail are contiguous or touching so that oil flow from one gap to another is blocked whenever the gaps are not aligned. If desired, the relative angular position of the rail and blocker ring may be fixed so the gaps will always be nonaligned. The blocker ring 28 is self-biased and preferably has very low tension to lightly slide on the wall.

The rail 26 is a conventional rail and is biased against the cylinder wall 12 to scrape oil from the wall. The bias force is provided by a coil spring 30 mounted between a separator ring 32 and the inner wall 34 of the groove. The separator ring is closed ended as shown in the top view of FIG. 4, the ends 35 being reduced in thickness and overlapping to close the gap. The separator ring 32 structure allows expansion to transfer the spring force to the rail 26. The separator ring also has an annular depression to seat the coil spring 30.

The vertical dimension of the separator ring 32 is sufficient to substantially extend across the groove to separate the inner end of the groove adjacent the inner wall 34 from the outboard groove region. The separator ring also has oil drain holes 33 spaced from the upper and lower walls of the groove 22. The inner groove region is thus segregated as a drainage area 36 and a drain passage 38 runs to the inside of the piston. The separator ring 32 thus acts as an oil trap by restricting the movement of oil into the region behind the ring when inertia forces drive the oil in the root of the groove upward, yet allows drainage of oil out of the region immediately behind the ring when inertia forces drive the oil downward. In essence, the separator ring utilizes the inertial forces associated with the piston motion to pump oil from the critical zone immediately behind a ring into a drainage region.

A dike 40 is formed by an annular recess 42 in the upper wall of the groove 22 between the separator ring 32 and the blocker ring 24. The dike will diminish leakage through the axial gap above the blocker ring 24 by trapping oil which approaches that gap from the rear. Thus even though some oil escapes from the region behind the separator ring 32 or does not enter that region, the dike 40 will intercept it. The dike and separator ring, in concert, provide an effective inhibitor to oil escape from the groove, but either feature may advantageously be used alone.

In operation, as the piston cycles in the cylinder the rail rides on a film which increases in thickness, if sufficient oil is available, with instantaneous speed modified by the effect of acceleration and deceleration. Acceleration results in a decrease in film thickness while deceleration results in an increase. On the downstroke, then, the rail leaves a deficit of oil on the upper half of the cylinder and an excess of oil on the lower half of the cylinder relative to what it can ride over on the following upstroke. During the first half of the upstroke, the excess oil will be scraped up and pushed ahead of the rail. When the piston passes midstroke it decelerates and some of the excess oil would, in the absence of a blocker ring, be thrown by inertia away from the rail/cylinder interface and never recovered. The blocker ring, however, captures the excess oil and holds it in position to build the maximum film for the rail to ride on in the second half of the upstroke. That excess oil is held at the interface of the blocker ring and the cylinder wall and is fed out by adding to the existing film on the cylinder wall. The capacity of the blocker ring to hold a quantity of oil is increased by increasing the ring thickness and by decreasing the ring tension. Thus the blocker ring differs from the rail by being thicker by a factor of perhaps three, and having less tension, say, half as much as the rail.

During the down stroke of the piston, the rail 26 scrapes oil from the cylinder wall 12. The gap between rail ends is unable to pass oil because it is stopped by the contiguous blocker ring 28. Some of the oil can flow between the groove wall and the bottom of the rail to the inner part of the groove 22. The apertured separator ring is intended to keep dry the region immediately at the rear of the blocker ring by allowing the oil to flow into the drainage area 36 and to retain the oil until it flows out the drain passage 38. Some amount of oil will not immediately pass through the holes 33 to the drainage area but will be thrown to the upper wall of the groove 22 during the upper half of the piston cycle due to the downward acceleration of the piston. In the absence of the dike 40, that oil would be able to leak out above or through the end gap of the blocker ring 24. The dike prevents such flow and the recess 42 collects oil during the upper half of the piston cycle. Then during the following lower half of the cycle the collected oil is thrown down toward the rail and can then flow through the separator ring holes 33 to the drain 38.

Figure 3:
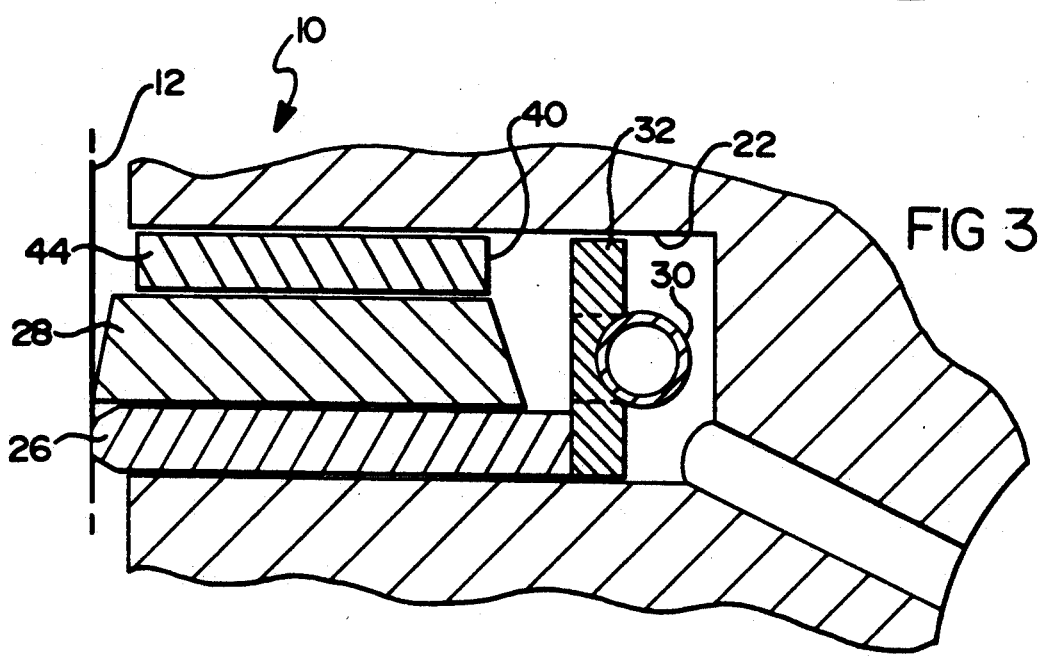
FIG. 3 is an enlarged detail cross section of an oil control seal assembly according to a second embodiment of the invention.

FIG. 3 shows another version of the dike arrangement. Rather than forming a recess 42 in the groove 22, a dike ring 44 is placed in the groove 22 above the blocker ring 28. The inner edge of the dike ring 44 serves as the dike 40. The dike ring is smaller than the cylinder diameter so that it does not touch the cylinder wall 12. The ring has ends and a negative tension which presses the ends together so there is no gap to allow oil flow. Thus, even though the dike ring 44 can be spread apart at its ends for assembly to the piston, it will thereafter be a closed ring to provide an unbreached dike 40.

The oil control ring assembly results in an improved oil economy as well as greatly reduced friction which leads to better fuel economy. The friction is reduced by using only one rail and a relatively low spring tension on the rail. Conventional ring packs have two o control rails each having a tension of 20 to 25 N(newtons). In an effort to improve oil economy, the high tension is employed in the conventional rings to scrape as much oil from the wall as possible to compensate for leakage around the rear of the rails and through the end gaps. In the system according to the invention it is preferred that the rail 26 have a tension on the order of 10 N. This is possible since the overall leakage is so low due to the improved oil control assembly that it is not essential to scrape so much oil from the cylinder wall. Further, the blocker ring 28, may have a tension on the order of 5 N. The blocker ring generally rides on the oil film left by the rail 26 except at the rail gap where the thicker oil layer is wiped off by the blocker ring. The end result of reduced friction has shown fuel economy improvements of 3.5%

FIG. 5 shows another embodiment of an oil control seal using a steel rail 26 and blocker ring 28 as in FIG. 2, a conic spring 50 bearing resiliently against the rail 26, and a combination separator and restraining ring 52. The conic spring 50 is shown with a plain cylindrical restraining ring 52' in FIG. 6. The conic spring 50 is a spring wire having a serpentine or sinuous shape conformed to a frustoconical envelope. The spring has bends 54 at the top in engagement with the restraining ring 52' connected by diagonal portions 56 to alternate bends 58 at the bottom which flares out to a larger diameter than the top, when unloaded, and so is spaced from the restraining ring at the bottom. When loaded by being deformed to fit within the ring assembly in the groove 22, the bottom of the spring 50 is pushed toward the ring 52 to develop a force against the rail. Thus the bends serve as contact portions with the ring 52 and rail 26.

The conic spring 50 may be best understood by reference to FIGS. 7 and 8. In FIG. 7, an uncurved blank 50' for a conic spring has a planar, serpentine form with the top bends 54, diagonal connector portions 56 and bottom bends 58. A pair of curvature vectors k1 and k2 are perpendicular to the longitudinal axis of the blank. The curvature vector k1 is in the plane of the blank and vector k2 is perpendicular to the plane of the blank 50'. For the straight blank the curvature values are zero. To make the conic form the blank is curved in both directions to form a nearly complete ring, although the ends are not butted together. There can be no circumferential loading when the ends do not touch. The spring is made to assume the conic form when unloaded or relaxed. For the conic form represented in FIG. 8, the spring has a mean diameter D and the conic surface makes an angle A with the cone axis. The overall curvature k is the reciprocal of the radius or $k=2/D$. The curvature $k1=k \sin A$ and the curvature $k2=k \cos a$. The spring force develops when the spring is deformed by deflecting the bottom bends to reduce the angle A. That is, the spring is loaded only by changing its curvatures k1 and k2. If the spring were compressed at the bottom until $A=0$, k1 would be zero and the spring would be cylindrical. This spring design is simple, has low strain levels, has minimal space requirements and has great design flexibility in spring rates and tensions, and thus is especially well adapted to control piston ring tension. The conic spring is not, however, limited to use in conjunction with piston rings; for example, it may be used with circular elastomeric seals. Further, it may be used with the restraining ring on the outer periphery to provide a radially inward force on a seal or other element engaged by the inner periphery.

Referring again to FIG. 5, the combination separator and restraining ring 52 has a vertical body 60 (extending axially of the piston) spaced from the bottom of the groove 22 to define an oil drainage passage 62, an upper, outboard flange 64 extending radially from the body 60, and a lip 66 depending from the outer rim of the flange 64 and extending diagonally down and out from the flange toward the rear of the rail 26. The ring thus forms a pocket 68 between the lip 66 and the body 60 which contains the upper part of the conic spring 50. The lip 66 serves as a separator ring to inhibit the movement of oil into the space behind the blocker ring.

FIGS. 9 and 10 show embodiments similar to that of FIG. 5 and are characterized by a second conic spring for applying tension for the blocker ring. This allows the blocker ring to have less self tension and can conform better to the shape of the cylinder wall while providing the desired tension by the conic spring. In FIG. 9, the combination separator and restraining ring 52 is like that of FIG. 5 except for a modified lip 66 having a cylindrical outer face. The lip 66 is spaced from the blocker ring 28 and the second conic spring 70 resides in that space. The second conic spring 70 is restrained by the lip 66 and biases the blocker ring 28 outwardly and the first conic spring 50 is restrained by the body 60 and bears against the rail 26, as before.

The embodiment shown in FIG. 10 has a groove 22 with a stepped upper wall characterized by a first downward step 72 inboard of the blocker ring 28 and above the inner edge of the rail 26, and a second downward step 74 inboard of the first step 72. An annular separator and restraining member 76 abuts the step 72 and extends toward the upper surface of the rail 26 adjacent its inner edge. The member 76 inhibits the movement of oil to the space behind the blocker ring but has oil drainage passages 78 at its lower edge adjacent the rail for drainage of any oil which enters that space. The conic spring 70 bears against the upper outboard side of the restraining member 76 and the blocker ring 28, while the first conic spring 50 bears against the second step 74 and the rail 26.

FIG. 11 shows another embodiment most similar to that of FIG. 9 in that a straight groove 22 is provided in the piston 10 and the split steel rail 26 and split blocker ring 28 mounted above and contiguous with the rail 26 are both biased into engagement with the cylinder wall 12. A seal ring 80 engages the inner face of the blocker ring and is biased against the upper side of the groove 22 to block the flow of oil out through the clearance between the blocker ring 28 and the groove 22. The seal ring is split, having an expansion gap, not shown, which may be of closed end configuration having overlapping ends similar to the ends 35 of the ring 32 in FIG. 4.

A first conic spring 82 engages both the rail 26 and the seal ring 80 and is in turn engaged by a second conic spring 84 that also engages a restraining ring 86 spaced from the inner end of the piston groove 22. The second spring 84 urges the first spring 82 outward against the rail 26, thereby biasing the rail against the cylinder 12. The first ring 82 also biases the blocker ring 28 against the cylinder through its engagement with the seal ring 80. The upper portion of the inner surface of the seal ring 80 engaged by the spring 82 has an upwardly and inwardly sloping surface 88 that causes its engagement by the spring 82 to force the seal ring 80 upward against the upper side of the groove 22, sealing the clearance as described. The lower portion of the seal ring inner surface may have a similar oppositely sloped surface 88 which allows the seal ring 80 to be installed in either of the two possible orientations.

In operation, the seal ring 80, by blocking the escape of oil through the clearance above the blocker ring 28, constitutes means for trapping oil in the space behind the ring assembly until the oil is directed, in the lower half of the piston motion, to escape out through the drain passage 38 provided at the lower rear portion of the groove 22. As in the embodiments of FIGS. 5 and 9, the restraining ring 86 floats in the groove 22 with the assembly of the other rings 26, 28, 80 and springs 82, 84 to minimize flexing of the springs and maintain a relatively constant force of the rail 26 and blocker ring 28 on the cylinder 12 in spite of the lateral movements of the piston 10 during the operating cycle.

FIG. 12 shows a modified embodiment most similar to that of FIG. 11 wherein like numerals are used for like parts. It differs in that the the restraining ring and conic springs of FIG. 11 are omitted. Instead, the rail 26, blocker ring 28 and seal ring 80 of FIG. 12 are tensioned by a compression spring 90 of U-shaped cross section. As before, the spring 90 floats with the ring assembly to provide a constant biasing force.

FIG. 13 shows a short segment of the compression spring 90 illustrating its configuration of alternating upper and lower bends 92, 94 connected by curved connecting portions 96. In assembly, as shown in FIG. 12, the upper bends 92 engage the upper sloping surface 88 of the seal ring 80 to bias the ring 80 upwardly against the top of the ring groove 22 and outwardly against the blocker ring 28. The lower bends 94, in turn, engage the steel rail 26 to bias it outwardly against the cylinder.

The embodiments of the invention in which an exclusive property or privilege is claimed are defined as follows:

1. A piston and ring assembly comprising:
   a piston for reciprocating movement in a cylinder between a lower crankcase and an upper compression head,
   the piston having an annular groove for oil control, the groove defining an inner wall and an upper surface,
   a single rail in the groove for slidably engaging the cylinder wall to inhibit oil passage across the rail and to spread a thin film of oil on the wall, the rail having spaced ends which potentially allow oil leakage,
   spring means between the rail and the inner wall of the groove for biasing the rail against the cylinder with a desired tension to control the thickness of the oil film, and
   a blocker ring in the groove above the rail and contiguous with the rail adjacent the cylinder for blocking oil leakage past the ends of the rail, the blocker ring having sufficient tension to lightly contact the cylinder wall and ride on the oil film,
   wherein the rail and the blocker ring comprise plural rings that substantially fill outer portions of the groove except for limited axial clearance and the space between the blocker ring and the inner wall of the groove includes trapping means adjacent the upper surface for trapping oil during the upper half of the piston movement, the piston having oil vent means coupled to a lower portion of the groove for draining the trapped oil.

2. The invention as defined in claim 1 wherein the trapping means comprises a dike ring between the blocker ring and the upper surface of the groove for forming an oil space at the top of the groove.

3. The invention as defined in claim 1 wherein the trapping means oil comprises a dike recess formed in the upper surface of the groove.

4. The invention as defined in claim 1 wherein the trapping means comprises a separator ring between the blocker ring and the wall, the separator ring having a body portion residing in the upper portion of the groove, a radial outboard flange at one end opposite the rail extending toward the blocker ring and a lip depending from the outboard edge of the flange and extending toward the rail for trapping oil between the lip and the inner wall, the body being spaced from the bottom of the groove to allow passage of trapped oil toward the inner wall of the groove.

5. The invention as defined in claim 4 wherein the spring means resides between the body of the separator ring and the rail, and the spring means comprises a sinuous spring having a frustoconical form when unloaded and having alternate contact portions bearing radially against the rail and the body of the separator ring, respectively, and being loaded when assembled to apply a tension to the rail.

6. The invention as defined in claim 1 further including means for defining a drainage area in the groove adjacent the inner wall comprising a separator ring spaced from the wall, the separator ring having passage means to permit oil to flow into the drainage area.

7. The invention as defined in claim 6 wherein the spring means is between the separator and the inner wall of the groove and acts on the rail through the separator.

8. The invention as defined in claim 1 wherein the trapping means comprise a seal ring biased into engagement with the groove upper surface and an inner side of the blocker ring to trap oil behind the blocker ring.

9. A piston and ring assembly comprising:
   a piston for reciprocating movement in a cylinder between a lower crankcase and an upper compression head,
   the piston having an annular groove for seal means and oil vent means coupled with the groove, the groove having an inner wall and upper and lower walls,
   a piston ring in the groove for slidably engaging the cylinder wall with sufficient tension to inhibit fluid leakage across the ring, the ring comprising one of plural rings that substantially fill outer portions of the groove except for having limited axial clearance which potentially allows oil leakage into the groove, the oil in the groove being subject to being thrown toward the upper wall during the upper half of the piston movement, and
   trapping means separate from the piston ring and adjacent the groove upper surface for trapping oil during the upper half of the piston movement to prevent oil leakage from the groove and to allow drainage through the oil vent means during the lower half of the piston movement.

10. The invention as defined in claim 9 wherein the trapping means comprises a dike ring adjacent the upper wall of the groove for forming an oil space at the top of the groove.

11. The invention as defined in claim 9 wherein the means for trapping oil comprises a dike recess formed in the upper wall of the groove.

12. The invention as defined in claim 9 further including means for defining a drainage area in the groove adjacent the inner wall and encompassing the oil vent means comprising a separator ring spaced from the inner wall and extending substantially the full width of the groove between the upper and lower walls, the separator ring having passage means to permit oil to flow into the drainage area.

13. The invention as defined in claim 9 wherein the trapping means comprise a seal ring biased into engagement with the groove upper surface and an inner side of the piston ring to trap oil behind the piston ring.

14. The invention as defined in claim 13 wherein the seal ring has an inner side with a downwardly and outwardly sloping portion, and spring means engaging the sloping portion for biasing the seal ring upwardly and outwardly.

15. A piston and ring assembly comprising:
    a piston for reciprocating movement in a cylinder between a lower crankcase and an upper compression head, the piston having an annular groove with an inner wall and upper and lower walls, and oil vent means coupled to a lower portion of the groove, a single rail along the lower wall in the groove for slidably engaging the cylinder wall with sufficient tension to maintain a desired thickness of oil film on the wall, the rail having spaced ends which potentially allow oil leakage past the rail, a blocker ring in the groove above and contiguous with the rail for blocking oil leakage past the ends of the rail, the blocker ring being biased to contact the cylinder wall, and a seal ring biased into engagement with the groove upper surface and an inner side of the blocker ring to trap oil behind the blocker ring.

16. The invention as defined in claim 15 and further comprising spring means engaging the seal ring and the single rail for biasing the blocker ring and the rail against the cylinder wall and biasing the seal ring against the blocker ring and the groove upper wall.

17. The invention as defined in claim 16 and further comprising restraining means in the groove spaced from the inner wall and floating with the ring assembly, the spring means engaging the restraining means as support for biasing the rings and rail.

18. The invention as defined in claim 16 wherein the spring means is spaced from the groove inner wall and floats with the ring assembly.

19. The invention as defined in claim 18 wherein the spring means comprise a single compression spring.

20. The invention as defined in claim 16 wherein the seal ring has an inner side with a downwardly and outwardly sloping portion that is engaged by the spring means.

* * * * *